United States Patent [19]

Brooks

[11] Patent Number: 5,045,770

[45] Date of Patent: Sep. 3, 1991

[54] SHUNT REGULATOR FOR USE WITH RESONANT INPUT SOURCE

[75] Inventor: David R. Brooks, Perth, Australia

[73] Assignee: Magellan Corporation (Aust.) Pty. Ltd., Australia

[21] Appl. No.: 459,766

[22] PCT Filed: Feb. 3, 1989

[86] PCT No.: PCT/AU89/00035

§ 371 Date: Jan. 10, 1990

§ 102(e) Date: Jan. 10, 1990

[87] PCT Pub. No.: WO89/07295

PCT Pub. Date: Aug. 10, 1989

[30] Foreign Application Priority Data

Feb. 4, 1988 [AU] Australia ................. PI6580

[51] Int. Cl.⁵ ............................. G05F 1/613
[52] U.S. Cl. ..................... 323/223; 323/220
[58] Field of Search ............ 323/220, 223, 232; 363/127

[56] References Cited

U.S. PATENT DOCUMENTS

| | | | |
|---|---|---|---|
| 3,141,124 | 7/1964 | Atherton | 323/66 |
| 3,229,185 | 1/1966 | Nye | 323/45 |
| 3,244,949 | 4/1966 | Hilbiber | 323/223 |
| 3,551,745 | 12/1970 | Nicholas | 317/16 |
| 3,882,372 | 5/1975 | Martynow et al. | 323/226 |
| 3,946,303 | 3/1976 | Streit et al. | 323/280 |
| 4,012,684 | 3/1977 | Schade, Jr. | 323/226 |
| 4,075,546 | 2/1978 | Barber | 323/224 |
| 4,088,941 | 6/1978 | Wheatley, Jr. | 323/226 |
| 4,103,219 | 7/1978 | Wheatley | 323/226 |
| 4,264,857 | 4/1981 | Jambotkar | 323/226 |
| 4,614,906 | 9/1986 | Maxham | 323/224 |
| 4,647,830 | 3/1987 | Bees | 363/58 |
| 4,700,124 | 10/1987 | Anderson | 323/225 |
| 4,700,286 | 10/1987 | Bingham | 363/127 |
| 4,752,776 | 6/1988 | Katzenstein | 340/825.54 |
| 4,914,539 | 4/1990 | Turner et al. | 323/223 |
| 4,931,716 | 6/1990 | Jovanovic et al. | 323/224 |

Primary Examiner—Steven L. Stephan
Assistant Examiner—Jeffrey Sterrett
Attorney, Agent, or Firm—Learman & McCulloch

[57] ABSTRACT

A regulator is provided for receiving electrical power from an external alternating magnetic field and developing a regulated output voltage. The regulator is operatively coupled to a resonant inductive circuit for obtaining input power. It includes a circuit for regulating output power by shunting input power and providing separate current paths for shunt current and output current. The circuit includes a rectifier in the output current path. The regulator is integrated on a single VLSI chip.

27 Claims, 2 Drawing Sheets

MOS TRANSISTOR REGULATOR

SHUNT REGULATOR (PRIOR ART)

INDUCTIVE-POWERED REGULATOR

MOS TRANSISTOR REGULATOR

SHUNT REGULATOR FOR USE WITH RESONANT INPUT SOURCE

FIELD OF INVENTION

The present invention relates to the field of power regulation. More particularly, the invention relates to a regulator useful in apparatus intended to receive electrical power from an external, alternating magnetic field. Most particularly the invention relates to a regulator adapted for substantially total integration on a single VLSI "chip".

Examples of practical devices falling into the above categories would include baggage identification tags, personnel security badges, electronic locks and keys, remote-controlled actuators, and "smart" credit cards.

PRIOR ART

In apparatus adapted to receive power from an external magnetic field, a particular problem has been to compensate for variations in the field intensity at different points in space. This causes the apparatus to receive variable amounts of electrical power.

For such applications, the so-called "shunt" regulator configuration is usually preferred, for the following reasons:

a) The shunt regulator possesses inherent ability to control its input voltage. Regulators such as the "series" type can control only their output, while the input voltage may rise to dangerous levels. The series-type regulators are therefore not desirable when the regulator is to be included with the remainder of the required circuitry, on a single VLSI "chip", as such chips are highly susceptible to damage by over-voltages. The shunt regulator by comparison, operates by imposing an additional load on its power source, sufficient to prevent the input voltage from rising above the intended value.

b) When the power available is only just sufficient to permit operation of the device, it is desirable that the regulator circuit itself should consume a minimum of additional power. Series regulators generally consume significant amounts of power in their own operation, while a shunt regulator may consume almost no power, as the shunt element ("L" in FIG. 1) is essentially turned off.

Several prior-art shunt regulators have been disclosed.

U.S. Pat. No. 4,614,906 discloses the use of a shunt regulator to permit a plurality of loads to be connected across a single, high-voltage supply.

U.S. Pat. No. 4,103,219 discloses a DC supply, rather than a resonant, AC supply. Essentially it follows the known configuration of FIG. 1.

U.S. Pat. No. 3,551,745 discloses the addition of an over-voltage trip to a conventional shunt regulator.

U.S. Pat. No. 3,229,185 discloses an AC supply, although no resonant (it is a conventional transformer). It discloses means of improving the performance of the well-known Zener diode type of shunt regulator.

U.S. Pat. No. 3,141,124 discloses additional loads switched into a (untuned) transformer circuit by Silicon Controlled Rectifier devices. These latter regulators are unsuitable for implementation in VLSI chips.

The principal elements of a shunt regulator, according to prior art, are shown in FIG. 1.

The known shunt regulator consists of a DC power source, S, of uncertain voltage, connected through a resistance R, to output terminals, O, at which there is provided a stabilised voltage. The output voltage is sensed by the amplifier A, and compared to a known reference voltage, V, (developed by a zener diode, band-gap circuit, or the like). The amplifier develops an error voltage, proportional to the difference between the output and reference voltages. This error voltage serves to control the load L (which may take the form of a large transistor, or other power-absorbing device).

It can be seen that the current passing through R will be the sum of that delivered to the load at O, plus that drawn by the controlled load L. The controlling action is provided by adjusting the current through L so as to cause a voltage drop across R. This reduces the incoming voltage S to the desired output voltage, D.

Either the Output or Reference voltages may be attenuated by a resistive voltage divider circuit, before reaching the amplifier A, if desired.

It is apparent from the figure that all parts of the circuit, except the input resistor R, are subjected to the output voltage D, rather than the (higher) input voltage S. Hence, the shunt regulator serves to protect its input circuitry from over-voltages.

As can be seen, the prior art regulators do not readily lend themselves to integratability due to the use of large chip area consuming components such as the resistor, R.

A further disadvantage of certain prior art shunt regulators is apparent from consideration of FIG. 2, which shows a regulator according to FIG. 1, now modified to accept power from a resonant source LC. It will be apparent that the rectifier D is required to carry not only the "useful" current (i.e. that ultimately delivered to the load at O) but also the "waste" power dissipated in the regulator load L. Thus the rectifier must be made larger than otherwise necessary. Similarly, the reservoir capacitor C must be increased in size, to contain the output - voltage "ripple" due to the additional current drawn by the shunt regulator.

OBJECTS OF THE PRESENT INVENTION

An object of the present invention is to alleviate the disadvantages of the prior art.

A further object of the present invention is to provide an efficient means of supply voltage regulation for inductively powered devices.

A further object of the present invention is to provide a regulator adapted for integration using VLSI techniques.

A further object of the present invention is to provide a shunt regulator which does not require a 'voltage-drop' resistor within its circuit.

SUMMARY OF THE INVENTION

The present invention provides in one form, a regulator adapted for shunt operation comprising means for regulating a supply voltage or current by diverting excess electrical energy.

The regulator of the present invention may provide, wherein said energy is current.

The regulator of the present invention may provide, wherein said shunt operation occurs without utilizing a voltage drop resistive means.

The regulator of the present invention may provide, wherein said regulator is operatively coupled to a resonant inductive means.

The regulator of the present invention may provide, wherein the inductive means receives a magnetic power field and provides a signal for regulation by said regulator. The regulator of the present invention may provide, wherein said regulating means includes shunt means and rectifier means.

The regulator of the present invention may provide, wherein the shunt means comprises means for selectively providing a variable magnitude current path for diverting said excess energy.

The regulator of the present invention may provide, wherein said rectifier means comprises diode means coupled with charge storage means for providing a filtered output.

The regulator of the present invention may provide, wherein the current paths used for regulation and for useful output are separated, and further wherein the rectifier means is in the useful output path.

The regulator of the present invention may provide, wherein said rectifier means is provided between said shunt means and the regulator output.

The regulator of the present invention may provide an error amplifier (as more fully described hereinafter, and exemplified in the amplifier "A" of FIGS. 1 to 3) which may take the form of a voltage comparator and a Switched-Capacitor Filter (SCF).

The regulator of the present invention may provide the output stage of the SCF to be adapted to provide a drive voltage to the shunt load device over more than half the period of the input AC waveform.

The present invention also provides, in another form, an integratable regulator comprising inductive means for receiving an impinging magnetic field, shunting means adapted to divert excess power received by said inductive means and rectifier means coupled with charge storage means for providing a filtered output.

The integratable regulator described above may not include a resistive element for dissipating said excess power.

The present invention may provide a regulator wherein the regulating action is obtained by placing a load across a tuned circuit, so causing an apparent reduction in the "Q-factor" of said tuned circuit, thereby reducing the voltage appearing across said tuned circuit.

The present invention also provides, in another form, a regulator adapted to provide a predetermined voltage at its output comprising, in combination, a tuned circuit including means for receiving an impinging magnetic powering field, and a shunt regulator including reference voltage means and sensor means adapted to provide a control signal to a shunt for dissipating excess power, wherein said shunt regulator further includes rectifier and charge storage means for respectively rectifying said powering field and supplying said predetermined voltage.

The present invention also provides, in yet another form, an integratable regulator adapted to provide a predetermined voltage at its output comprising:

a tuned circuit including inductive means for receiving an applied magnetic power field, and a shunt regulator including comparator means for comparing an output voltage and a reference voltage and providing a shunt control signal, shunt means for shunting power in response to said shunt control signal and rectifier and charge storage means for stabilising said output voltage, wherein said shunt means is juxtaposed said tuned circuit in order to shield the remainder of said integratable regulator from excess power and said shunt regulator is adapted to shunt excess power when said output voltage exceeds said predetermined voltage in order to maintain said voltages substantially equal.

The present invention also provides, in another form, an integratable shunt regulator comprising shunt means adapted to receive an input voltage and provide, as an output, a predetermined voltage by way of shunting voltage in excess of said predetermined voltage, and rectifier and charge storage means adapted to receive said predetermined voltage and, respectfully, rectify, filter and store said predetermined voltage and provide, as an output, a substantially stable supply voltage.

The shunt means described above may further include comparator means adapted to provide a controlling signal for shunting said voltage in excess of said predetermined voltage, the comparison being determined based on said output and a reference voltage.

Preferred embodiments of the present invention will now be described with reference to the accompanying drawings, wherein.

It should be noted that for simplicity the present disclosure is made with reference to a "negative ground" configuration. As would be understood by the skilled addressee, a "positive ground" configuration is equally possible, by reversing component polarities, and is to be understood as falling within the scope of the present invention. Likewise the present disclosure is made with reference to a CMOS implementation, while other forms (such as NMOS, bipolar, etc.) are also feasible, as would be appreciated by those skilled in the art.

Figure 2:
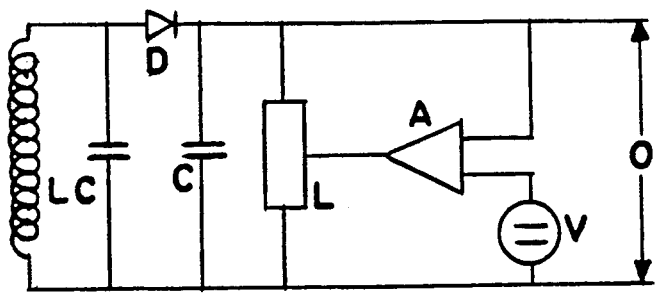

FIG. 2 shows a regulator configuation which has dispensed with resistor R.

The combination of two, known, circuits (the resonant power pick-up circuit and the shunt regulator) are seen to yield a circuit inherently protected against overvoltages. The elimination of the large resistor R is a further advantage.

Figure 1:
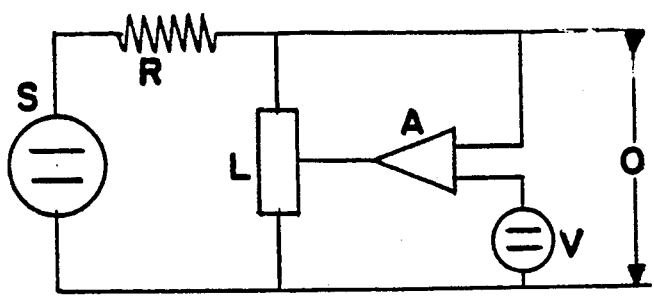
FIGS. 1 and 2 show prior art arrangements.

With reference to FIG. 2, as compared to FIG. 1, the original DC power source has been replaced by a tuned capacitor power pick-up circuit LC for receiving an impinging magnetic powering field with a rectifier D and reservoir capacitor C. A well-known half-wave rectifier circuit is shown, however any standard rectifier configuration may be used.

The omitted resistor R has had its place taken by the tuned circuit LC, which is very loosely coupled to the AC power source (probably being some significant distance from it). In this situation, the voltage developed across LC will be that induced by the imposed magnetic field, multiplied by the "Q"-factor of the LC circuit. This "Q"-factor is highly dependent on the load applied to the LC circuit.

The function of the arrangement shown in FIG. 2 may be considered by realising that the impinging magnetic field will deliver a certain amount of energy to the circuit LC, in each AC cycle. The voltage of the tuned circuit will therefore rise, until an equal amount of energy is removed, in each cycle, by the combined loads at L and C. The adjustable load L may therefore act to control the supply voltage in a manner similar to the circuit of FIG. 1.

Conveniently, the tuned source LC will be designed according to the following criteria:

a) It should be resonant at the desired operating frequency.

b) It should be designed for substantially optimum power transfer (i.e. an "impedance match") to the useful load O, in the absence of the regulating element L. This condition may be recognised by comparing the "Q-factor" of the circuit LC alone (the "unloaded Q") with the "Q-factor" in the presence of the useful load O (the "loaded Q"). With optimal matching, the loaded Q will be half the unloaded Q.

If the above criteria is met, it has been found that the regulating action occurs by a combination of 3 mechanisms, in cooperation:

a) excess energy is diverted into the load L b) the Q-factor of LC is reduced, so lowering the voltage seen c) the power-match to the load O is progressively reduced from optimum, so that less power is transferred to O.

The combination of these effects has the result that, as input power (i.e. magnetic field strength) is increased, power dissipation in the load L rises to a maximum, and then reduces. By contrast, the dissipation in a conventional shunt regulator will increase continually as the input field strength increases, thereby causing possible overheating problems.

It has been observed that in the arrangement of FIG. 2, the rectifier D will conduct during only a small portion (the 'conduction angle') of the entire AC cycle. The width of this conduction angle will depend on the value of the reservoir capacitor C, and on the total load current. Since the requisite total energy per cycle must still be delivered, the smaller the angle, the greater tha peak current through the rectifier D.

If the load L is to absorb energy throughout the AC cycle, additional current must be supplied (during that portion of the AC cycle when the rectifier does not conduct) by the charge remaining on the capacitor C. Hence the voltage at C will fall by an excessive amount before C is charged again on the next cycle. The effect is to increase both the conduction angle and the output-voltage 'ripple'.

If, however, the amplifier is adapted to 'turn on' the load L only while the rectifier is conducting, excessive load on the capacitor C may be avoided but at the expense of a short 'conduction' angle, for L. As with the rectifier, this translates into high peak currents in L, and the need for a larger device to handle them. Further, the rectifier D must be of a size sufficient to carry not only the "useful" output current to O, but also the worst-case additional load through the regulator L. This can cause a considerable size increase when realising the device.

Figure 3:
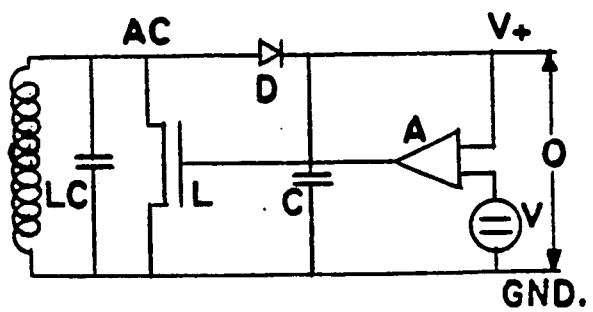
FIGS. 3 and 4 show preferred embodiments of the present invention.

FIG. 3 shows a regulator (an improvement on FIG. 2) wherein the current paths used for voltage regulation (through L), and for useful-output (through D and C) are separated. The use of a transistor (especially a MOS transistor) directly connected across the tuned circuit has been shown to confer significant benefits in the operation of such a shunt regulator, permitting the voltage regulating and power-delivery functions to be separated, with consequent size reductions to both groups of components. This yields especial benefits if the device is to be implemented in a VLSI assembly.

In the schematic, shown in FIG. 3, the load L is shown as a P-channel MOS transistor, to demonstrate the particular suitability of this circuit for VLSI implementation. However, a bipolar transistor or other suitable device would also serve.

Circuit operation is as follows—The gate of L is biased to some value between GND and V+ (by a similar amplifier arrangement to that of FIG. 2). When AC signal swings negative from GND, the transistor's gate is more positive than its channel, and no current flows. When the "AC" end of the transistor's channel swings above the gate voltage, the transistor begins to conduct. Since the AC signal exhibits a sinusoidal voltage about GND, the higher the gate voltage, the shorter the period ('conduction angle') during which the AC signal is above the gate voltage, and L conducts. Furthermore, the AC point rises to a lesser voltage above the gate, thus causing L to conduct less heavily.

The transistor therefore constitutes an adjustable load, as desired. It operates, as before, by loading the tuned circuit. It is to be noted that the resonant nature of the supply circuit LC, ensures that the waveform at AC remains substantially sinusoidal, in the presence of the intermittent loads presented by L and D.

It is apparent that not only does the current through L bypass, and accordingly not load, the rectifier D or the capacitor C, but also that the conduction angle of the load L may be varied at will, independently of that of the rectifier D. The components D and C may therefore be designed solely to handle the "useful load" delivered at O, while the transistor L is desired independently, to absorb sufficient power to exert adequate control.

Since the conduction angle at L may be increased to almost 180°, to achieve maximum loading, the peak current through L may be limited to a relatively modest value. This permits a reasonably sized transistor to be used at L.

It is possible to replace the single transistor L, by a parallel pair of transistors, of complementary polarities. In this case, the two transistors will conduct on opposite half-cycles of the AC waveform, and the total conduction angle can approach 360°.

Alternatively, the device hereinafter described may be employed to increase the conduction angle of a single transistor beyond 180 degrees.

An alternative embodiment of the present invention will now be described, with reference to FIG. 4, which shows an embodiment designed for an application as follows:

Powering frequency: 132 kHz
Required Output: 5 V at 5 mA

Figure 4:
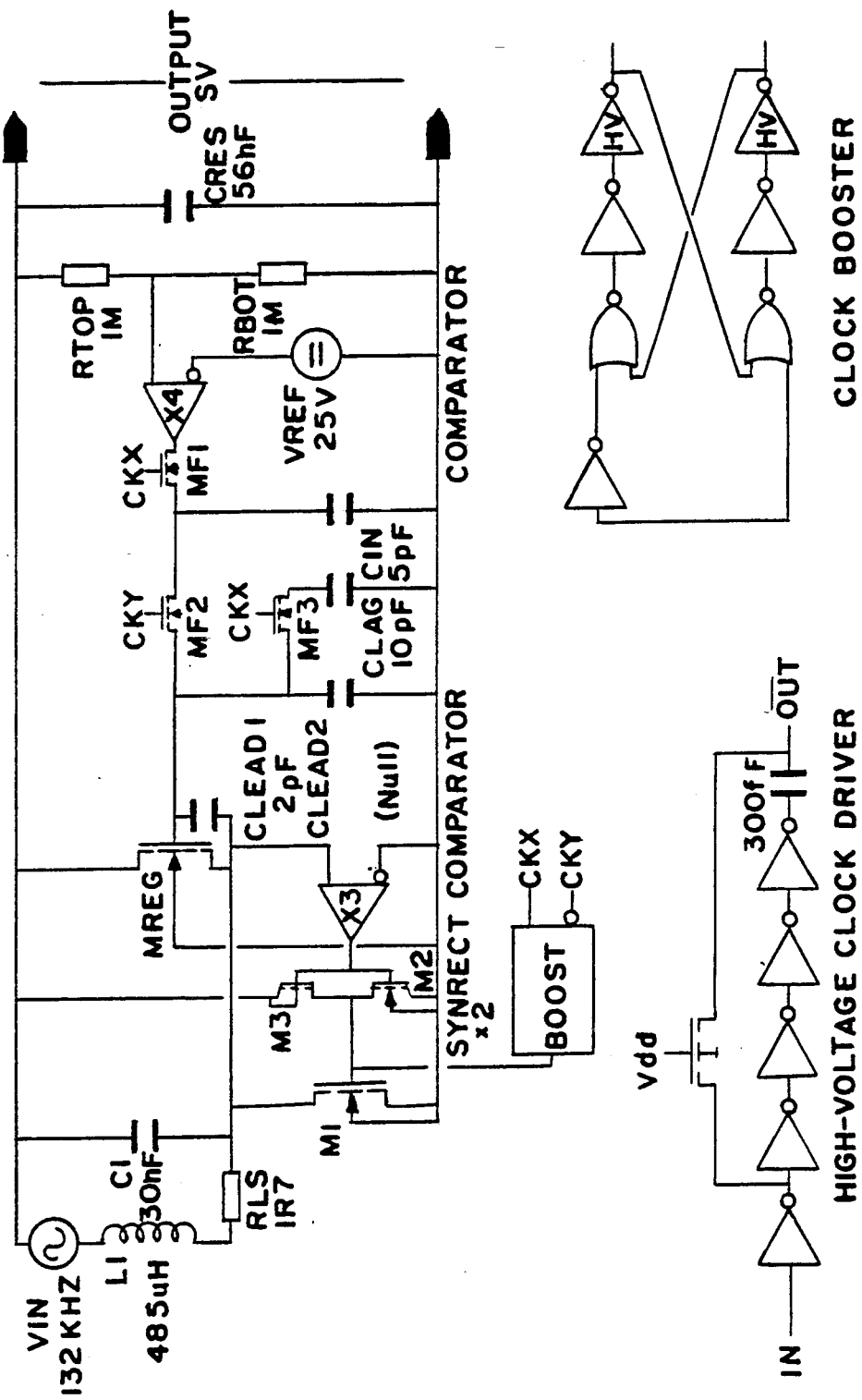

FIG. 4 shows a complete power supply stage, including a Synchronous Rectifier, the subject of a copending Application, entitled "Integratable Synchronous Rectifier", filed Nov. 19, 1987 by the present applicant as Australian Provisional Patent Application No. PI 5507. Detailed circuit forms, appropriate to a 3-micron CMOS process, are given in the PSPICE file as hereinafter described. (PSPICE, an industry standard circuit simulation program, is published by MicroSim Corporation, U.S.A.).

In the example, a further design aim was to eliminate the usual, large DC output capacitor. The example circuit is capable with only the small reservoir capacitor CRES, of stabilising its output voltage, within 1 V of target, and of correcting within 100 uS, for input-voltage changes of 2:1, and for load resistance changes of 3:1.

The circuit configuration of FIG. 4 is derived from that of FIG. 3, with the following changes:

a) A Synchronous Rectifier (the subject of the co-pending Application) has been included, said Rectifier being placed in the negative supply rail, rather than (as in FIG. 3) in the positive rail.

b) The error amplifier has been embodied as a voltage comparator and a SCF.

c) The circuit has been arranged so that all MOS transistors used in the power-processing circuits are of a single polarity (here, N-channel). This permits the VLSI chip to be laid out with no "well" boundaries near the power circuits, thereby conferring enhanced resistance to "latch-up", in view of the need to drive circuit nodes outside the power-supply rail voltages. N-channel transistors may be preferred for the power-processing circuits, due to their higher carrier mobility, which results in a N-channel device being typically 3 times smaller than a P-channel transistor designed for similar duty.

Circuit operation will be described, with reference to FIG. 4. VIN represents the voltage induced in the coil L1 by the external AC magnetic field. RLS represents the ohmic losses associated with L1. C1 is the tuning capacitor.

X3, M1, M2, and M3 represent a Synchronous Rectifier, whose operation is described in the copending Application PI 5507.

The shunt load (L in FIG. 3) is the transistor MREG, which conducts during those portions of the AC cycle when its Source is at a more negative voltage than its Gate. Since the said Source follows the AC wave, while the Gate is held at a substantially constant value, an adjustment of the Gate voltage will serve to vary the portion of the AC wave during which MREG conducts. In the example, this voltage is developed by the SCF comprising the pass-gates MF1, MF2, MF3, and the capacitors CIN, CLAG, CLEAD. This circuit serves to integrate the digital pulses from the comparator X4, which compares the output voltage with a 2.5 V reference (assumed to be obtained from a Band-Gap, or other standard circuit). It may be noted that circuit economy is obtained by utilising the clock signal already developed for the Synchronous Rectifier to operate the SCF, via the BOOST block. The latter is a conventional non-overlapping 2-phase clock generator, whose output stages are arranged to develop voltages above the positive supply rail, thereby enabling the transmission gates MF1, etc., to transfer voltages approaching the full rail value.

The SCF is a conventional 3-component arrangement, in which CIN simulates a resistor, and provides a basic integration function with CLAG. CLEAD simulates a second resistor, and introduces a small phase-advance into the filter characteristic, which speeds up the circuit's response to disturbances.

Note particularly the division of CLEAD into two parts, as shown. In practice, CLEAD1 is partially embodied in the stray gate/channel capacitance of MREG, and additional capacitors are used to adjust the values of CLEAD1 and CLEAD2. With the driving clocks phased as shown, the switch MF2 is closed during the bulk of the AC cycle, while the switches MF1, MF3 are closed only briefly, during the conduction period of the Synchronous Rectifier. Observe further, that during such conduction period, the Source of MREG is substantially at zero volts (being connected to the negative rail via the Synchronous Rectifier). During this brief period, the charges on CLAG and CLEAD equilibrate, while CIN assumes either zero or a maximal value, according to the state of the comparator X4. As the Synchronous Rectifier ceases conduction, the charges on CIN and CLEAD equilibrate, while CLAG is isolated. As the AC cycle proceeds, the Source of MREG swings positive (attaining a maximum value of substantially twice the positive rail). Since part of CLEAD is returned to that Source, it follows that the Gate of CLEAD receives an additional positive charge, tending to keep MREG in conduction longer than would be the case were CLEAD returned entirely to the negative rail. This device increase the fraction of the AC cycle during which MREG can conduct, so increasing the energy which the regulator can remove from the tuned circuit. This permits a small transistor to be used at MREG, for a given regulating action.

The following text is an implementation of the embodiment shown in FIG. 4 for PSPICE.

```
The following text is an implementation of the
embodiment shown in Figure 4 for PSPICE.

Resonant, Regulated Supply       [SUPPLY4.CIR]
* Mk-IV Version, using SCF and boosted NMOS clocks in
   Regulator loop
* Test for Line Regulation
*
.option it15=0 limpts=1000
+          reltol=1e-4          ;Reduced RELTOL for high-Q ckts.
*
.Lib..\3micron.lib               ;Semiconductor library file
*                                   (MOS Device Models)
```

```
.SUBCKT synrect 10 11 12 13   ;The Synchronous Rectifier
*                              proper
* Nodes are:    10      11        12          13
*              +ve Rail  Ac Input  Switch-Input Driver
*
m1 11 13  0  0 ntarg w=1800u l=5u   ;The actual rectifying
*                                    switch
*                                    Longer, to take high
*                                    voltages
m2 13 12  0  0 ntarg w=12u l=3u     ;The driving Buffer
m3 10 12 13 10 ptarg w=36u l=3u     ;P-channel wider, to even
*                                    drive
.ENDS
*
*

.SUBCKT comparator 10 11 12 13   ;Voltage Comparator
* Nodes are:    10      11         12         13
*              +ve Rail  Non-Inv In  Output    Invt In
*
*
*                              The "real" comparator
* m1 10 15 14 10 ptarg w=3u l=5u     ;First Input
* m2 14 11  0 10 ptarg w=3u l=8u
* m3 10 15 15 10 ptarg w=3u l=5u     ;Second Input
* m4 15 13  0 10 ptarg w=3u l=8u
* m5 10 15 17 10 ptarg w=11u l=8u    ;Current Source
* m6 17 14 16 10 ptarg w=22u l=4u    ;The Balanced Pair
* m7 17 15 12 10 ptarg w=22u l=4u
* m8 16 16  0  0 ntarg w=6u l=15u    ;Output Stage
* m9 12 16  0  0 ntarg w=6u l=15u    ; (Current Mirror)
*
*                        For faster simulation: quickie comp.
rser 11 13 1e9                      ;So no floating nodes
s1   10 12 13 11 compsw             ;Simulate from
                                     controlled switches
s2   12  0 11 13 compsw
.model compsw vswitch(ron=1e4 roff=1e9 von=-0.01 voff=0.01)
.ENDS
```

```
*************** NMOS Clock Booster - non overlapping pair
*               Fast, "dummy" hot-clock source -
*               See BOOST.CIR for the full circuit
.model topsw vswitch (ron=1e4 roff=1e9 von=0.1 voff=1.0)
.model botsw vswitch (ron=1e4 roff=1e9 von=-1.0 voff=-0.1)
*
.subckt side 20 21 22 24 25        ;Half the driver
esense      23 22 20 21 1.0        ;Transfer the input
*                                   voltage
rload       23 0      1e9          ;No floating nodes
stop        24 25 23 0 topsw       ;Output switches
sbottom        25 0  0 23 botsw
cout        25 0      100ff        ;Finite switching time
.ends
*SUBCKT boost 1 10 12 13           ;Vdd - IN - Out+ - Out-
*
eboost 2 0 1 0 1.4                 ;Develop the "hot-clock"
*                                   voltage
*
x1  1 10 13  2 12 side             ;The driver proper
x2 10  0 12  2 13 side
*
.ENDS
**************** The Full Regulator Circuit ****************
*                                  ;The primary AC source
vin 1 34 ac 2.0 132khz
+       sin(0 2.0 132khz)          ;Induced AC voltage
vst 34 32 sin(0 -1.0 132khz 227.28uS) ;Step in Input ampl.
*
l1  32 33 48.5uH                   ;The main resonant
*                                   components
rls 33 2 1.7                       ; and their losses
c1  1  2 30nF
rcp 1  2 6200
x2  1  2 3 15 synrect              ;Synchronous rectifier
x3  1  2 3  0 comparator           ;Rectifier Driver
*************** The SCF Regulator Filter ****************
   NB While AC swings high, the 2 caps. are paralleled, so
* minimising over-voltage effects due to charge-pumping from
* MREG's channel
```

```
mreg 1 14  2  0 ntarg w=3000u l=3u    ;The shunt regulator
                                       proper
*                                      It carries only Vdd
*                                      (each dirn.)
*
x20   1 15 17 18 boost                ;S.C.F. Clock Driver
mf1  12 17 13  0 ntarg                ;SCF switch no. 1
mf2  13 18 14  0 ntarg                ;             2
mf3  14 17 16  0 ntarg                ;             3
cin      13  0 5.0pF                  ;Input capacitor
*clead    14  0 2.0pF                 ;Phase-advance, with Cgs of
*                                      Shunt trans.
clag     16  0 10pF                   ;The main phase-lag
*
*                                      Shunt Regulator
x4    1 10 12 11 comparator           ;Test Voltage
vref    11  0 dc 2.5V                 ;Voltage Reference
rtop 1 10       1Meg                  ;Feedback Sense
rbot 0  0       1Meg
*
rl   1  0       1000                  ;Useful load - 25mW at 5V
cres 1  0       56nF                  ;Output reservoir cap.
*
******************** Test to be Run ********************
.probe v(1) v(2) id(mreg) i(vin) v(32)
+  v(12) v(13) v(14) v(15) v(16) v(17) v(18)
.tran 1us 350us
.end
NMOS Clock Booster - non-overlapping pair (BOOST.CIR)
Vdd  1 0  5
Vin 10 0 pulse(0 5 10n 2n 2n 60n 140n)
.Lib 3micron.lib
.tran 10n 200n
.probe
*
.subckt biginv 1 2 3     ;Wide Inverter
m1 1 2 3 1 ptarg w=15u
m2 0 2 3 0 ntarg w=5u
.ends
*
```

```
.subckt smlinv 1 2 3        ;Small Inverter
m1 1 2 3 1 ptarg
m2 0 2 3 0 ntarg
cd 0 3 100ff                ;Short delay
.ends
*
.subckt driver 1 2 8        ;The High-Voltage Clock Driver
*                            (inverting)
x1 1 2 3 biginv                  ;The delay chain
x2 1 2 4 smlinv                  ;The delay allows CB to charge,
*                                 before boost
x3 1 4 5 smlinv
x4 1 5 6 smlinv
x5 1 6 7 biginv
md 3 1 8 0 ntarg w=20u      ;Output "diode"
cb 7 8 300ff                ;Boost cap.
.ends
*
.subckt norgate 1 2 3 4     ;2-input NOR gate
m1 1 2 5 1 ptarg
m2 5 3 4 1 ptarg
m3 4 2 0 0 ntarg
m4 4 3 0 0 ntarg
.ends
x10 1 10 11     smlinv      ;The Mead/Conway clock circuit
x11 1 11 13 14 norgate
x12 1 10 12 15 norgate
x13 1 14 16     smlinv
x14 1 15 17     smlinv
x15 1 16 12     driver
x16 1 17 13     driver
*
ml1 1 12 21  0 nslow l=5u w=5u ;Dummy loads
ml2 1 13 22  0 nslow l=5u w=5u
rl1 0 21 1e7
rl2 0 22 1e7                ;Show how high a pass transistor
*                            can pull
.end
```

The claims defining the invention are as follows:

1. A regulator adapted for shunt operation, said regulator being operatively coupled to a resonant inductive means, said regulator obtaining input power from said inductive means, said regulator comprising
regulating means for regulating output power by shunting said input power;
said regulator having separate current paths for shunt current and output current.

2. A regulator as claimed in claim 1, which is integratable.

3. A regulator as claimed in claim 1, wherein said regulating means includes means for controlling the apparent "Q-factor" of said resonant inductive means.

4. A regulator as claimed in claim 1, wherein the inductive means is adapted to receive a magnetic powering field and provide a powering signal as said input power for regulation by said regulator.

5. A regulator as claimed in claim 4, wherein the inductive means is adapted to initially match the load to yield substantially maximum power-transfer and as the field increases, becomes progressively mis-matched; the mis-match serving to provide a further limitation on the power being delivered to the load.

6. A regulator as claimed in claim 3, wherein said inductive means is adapted to receive a magnetic powering field and initially match the load to yield substantially maximum power-transfer and as the field increases, becomes progressively mis-matched; the mis-match serving to provide a further limitation on the power being delivered to the load.

7. A regulator as claimed in claim 1 having a rectifier means arranged in the output current path.

8. A regulator as claimed in claim 7, wherein said rectifier means comprises diode means coupled with charge storage means for providing a filtered output.

9. A regulator as claimed in claim 8, wherein said regulating means includes means for selectively providing a variable magnitude current path for diverting said excess energy.

10. A regulator as claimed in claim 9, wherein said means for selectively providing a variable magnitude current path for diverting said excess energy comprises at least one MOS transistor.

11. A regulator as claimed in any one of claims 1 to 6, wherein said diversion is in the form of current.

12. A regulator as claimed in any one of claims 1 to 6, wherein said regulating means includes shunt means and rectifier means.

13. A regulator as claimed in claim 12, wherein said rectifier means is provided between said shunt means and the regulator output.

14. A regulator as claimed in any one of claim 1 to 6, comprising transistors of the same polarity to provide improved immunity against latch-up.

15. An integratable regulator comprising inductive means for receiving an impinging magnetic field and providing input power;
shunting means adapted to divert excess power of said input power provided by said inductive means;
rectifier means coupled with said inductive means and with charge storage means for providing a filtered output;
said regulator having separate paths for the excess power and the output power.

16. An integratable regulator as claimed in claim 15, wherein the regulator does not include a series resistive element for dissipating said excess power.

17. An integratable regulator as claimed in claim 15 or 16, wherein said shunting and rectifier means are arranged in parallel.

18. A regulator adapted to provide a predetermined voltage at its output comprising, in combination,
a tuned circuit including means for receiving an impinging magnetic powering field said powering field being provided as input power; and
a shunt regulating circuit adapted to shunt said input power, said circuit including rectifier and charge storage means for respectively rectifying and supplying said predetermined voltage, said circuit further including separate paths for shunted input power and said predetermined voltage;
said shunt regulating circuit further including reference voltage means and sensor means adapted to provide a control signal to said shunt for dissipating excess input power.

19. A regulator as claimed in claim 18, wherein said excess power is in the form of unrectified power.

20. A regulator as claimed in claim 18 or 19, wherein said sensor means comprises a voltage-comparator and a Switched-Capacitor Filter.

21. A regulator as claimed in claim 20, wherein said Switched-Capacitor Filter is adapted to provide a drive signal to said shunt throughout substantially the entire period of the applied AC waveform.

22. A regulator as claimed in claim 21, in combination with a Synchronous Rectifier.

23. A regulator as claimed in claim 22, wherein the Synchronous Rectifier and the Switched-Capacitor Filter are arranged to operate using the same clock signals.

24. An integratable regulator adapted to provide a predetermined voltage at its output comprising:
a tuned circuit including inductive means for receiving an applied magnetic powering field and providing input power; and
a shunt regulating circuit having separate paths for excess power and output power, said circuit including comparator means for comparing an output voltage and a reference voltage and providing a shunt control signal, shunt means for shunting excess power in response to said shunt control signal, rectifier and charge storage means for stabilising said output voltage, wherein
said shunt means is juxtaposed said tuned circuit in order to shield the remainder of said integratable regulator from excess input power; and
said shunt regulating circuit is adapted to shunt excess input power when said output voltage exceeds said predetermined voltage in order to maintain said output and predetermined voltages substantially equal.

25. An integratable shunt regulator comprising
shunt means adapted to receive an input voltage from a resonant inductive source and provide, as an output, a predetermined voltage by way of shunting excess energy for maintaining said predetermined voltage, and
rectifier and charge storage means adapted to receive said predetermined voltage and respectively, rectify and filter and store said predetermined voltage for providing, as an output, a substantially stable supply voltage.

26. An integratable shunt regulator as claimed in claim 25, wherein the shunt means further includes comparator means adapted to provide a controlling signal for shunting said excess energy, the comparison being determined based on said stable supply voltage output and a reference voltage.

27. A regulator as claimed in any one of claims 1 to 6, 15 to 16, 18 to 19, and 24 to 26, substantially embodied in a VLSI chip form.

* * * * *